(12) United States Patent
Ehrenkranz

(10) Patent No.: US 10,498,936 B2
(45) Date of Patent: Dec. 3, 2019

(54) ASSAY DETECTOR DEVICE COMPATIBLE WITH ANY DIGITAL CAMERA/PORTABLE COMPUTING DEVICE

(71) Applicant: i-calQ, LLC, Salt Lake City, UT (US)

(72) Inventor: Joel R. L. Ehrenkranz, Salt Lake City, UT (US)

(73) Assignee: i-CalQ, LLC, Salt Lake City, UT (US)

( * ) Notice: Subject to any disclaimer, the term of this patent is extended or adjusted under 35 U.S.C. 154(b) by 105 days.

(21) Appl. No.: 14/692,168

(22) Filed: Apr. 21, 2015

(65) Prior Publication Data
US 2015/0304555 A1    Oct. 22, 2015

Related U.S. Application Data

(60) Provisional application No. 61/982,040, filed on Apr. 21, 2014.

(51) Int. Cl.
*H04N 5/225* (2006.01)
*B01L 9/00* (2006.01)

(52) U.S. Cl.
CPC ............ *H04N 5/2254* (2013.01); *B01L 9/527* (2013.01); *H04N 5/2251* (2013.01); *H04N 5/2256* (2013.01); *B01L 2300/023* (2013.01); *B01L 2300/024* (2013.01); *B01L 2300/027* (2013.01)

(58) Field of Classification Search
CPC ..................................................... H04N 5/225
USPC .......................................... 348/373, 375, 376
See application file for complete search history.

(56) References Cited

U.S. PATENT DOCUMENTS

| 7,041,206 B2 | 5/2006 | Gephart et al. |
| 2005/0112024 A1* | 5/2005 | Guo ..................... A61B 10/007 422/562 |
| 2007/0031283 A1 | 2/2007 | Davis et al. |
| 2011/0009163 A1* | 1/2011 | Fletcher ............. G02B 21/0008 455/556.1 |
| 2012/0157160 A1* | 6/2012 | Ozcan ................ G01N 21/6458 455/556.1 |
| 2013/0084919 A1 | 4/2013 | Glynn |
| 2013/0157351 A1* | 6/2013 | Ozcan ................ G01N 21/6486 435/288.7 |

(Continued)

OTHER PUBLICATIONS

International Search Report and Written Opinion for PCT/US2015/026796, dated Sep. 21, 2015.

*Primary Examiner* — Anthony J Daniels
(74) *Attorney, Agent, or Firm* — Magleby Cataxinos & Greenwood

(57) ABSTRACT

Devices and methods for performing a point of care diagnostic test. In one embodiment, such a device may be adaptable to essentially any handheld digital imaging device. Such a device may include a sample holder for positioning an assay device in relation to the digital imaging device and an expandable/contractible member having the sample holder slidably coupled thereto. The expandable/contractible member is configured for removably attaching the testing device the digital imaging device and for positioning the sample holder in relation to an image capture means of the digital imaging device. In one embodiment, such devices may include a second slot configured for receiving one or more of a second assay cassette, an assay device, assay cassettes of various sizes, a printed circuit board, and the like.

16 Claims, 13 Drawing Sheets

(56) References Cited

U.S. PATENT DOCUMENTS

| | | | |
|---|---|---|---|
| 2013/0203043 A1* | 8/2013 | Ozcan | G06F 19/00 435/5 |
| 2014/0072189 A1* | 3/2014 | Jena | G01N 21/8483 382/128 |
| 2014/0120563 A1* | 5/2014 | Ozcan | G01N 21/274 435/7.94 |
| 2014/0142390 A1* | 5/2014 | Bromwich | A61B 1/00126 600/160 |
| 2014/0286550 A1 | 9/2014 | Buele et al. | |
| 2015/0031412 A1 | 1/2015 | Quilter et al. | |
| 2015/0309008 A1* | 10/2015 | Adelman | H04W 12/02 356/72 |
| 2016/0062099 A1* | 3/2016 | Shankar | G02B 21/24 359/384 |
| 2016/0080548 A1* | 3/2016 | Erickson | H04M 1/72527 455/556.1 |
| 2016/0290916 A1* | 10/2016 | Ben Shoshan | G01N 15/06 |
| 2016/0327473 A1* | 11/2016 | Ozcan | G01N 33/1813 |

\* cited by examiner

ASSAY DETECTOR DEVICE COMPATIBLE WITH ANY DIGITAL CAMERA/PORTABLE COMPUTING DEVICE

RELATED APPLICATIONS

This Application claims the benefit of and priority to U.S. Provisional Application No. 61/982,040 filed 21 Apr. 2014, the entirety of which is incorporated herein by reference. This application also incorporates by reference PCT Application PCT/US15/26796 filed 21 Apr. 2015, which claims the benefit of and priority to U.S. Provisional Application No. 61/982,040.

BACKGROUND

Sampling and testing of biological samples and body fluids (e.g., saliva, blood, urine, fecal matter, foods, plants, fish, minerals, animals, etc.) is common for both testing and monitoring humans, fish, animals, and plants for any number of biochemical or physiological conditions and, of course, for determining the general state of health of an organism. For example, sampling and testing of human body fluids is often performed for point-of-care testing ("POCT"). POCT is defined as medical testing at or near the site of patient care. The driving notion behind POCT is to perform and provide the test conveniently and immediately to the patient. This increases the likelihood that the patient, physician, and care team will receive the results more quickly and allows for immediate clinical management decisions to be made. POCT examples include, but are not limited to, blood glucose testing, metabolic testing (e.g., thyroid stimulating hormone), blood gas and electrolytes analysis, rapid coagulation testing, rapid cardiac markers diagnostics, drugs of abuse screening, urine testing, pregnancy testing, fecal occult blood analysis, food pathogen screening, hemoglobin diagnostics, infectious disease testing, cholesterol screening, cancer testing (e.g. PSA), hormone testing (hCG, LH, FSH), cardiac (troponin), pulmonary, gastroenterology (e.g., *H. pylori* antibodies), urology, dermatology, neurology, pediatrics, surgical, and public health (Ebola, cholera, HIV), testing and combinations thereof.

One testing method that is often employed for POCT and more conventional testing involves the use of lateral-flow chromatographic immunoassay cassettes. Lateral-flow chromatographic immunoassay cassettes can be used to easily and quickly obtain a variety of qualitative results relating to a number of biochemical and physiological conditions and disease states of an individual. These kinds of tests require the end user to simply add a sample to the cassette and then observe the result a few minutes later. Since such rapid and easy-to-use tests are user friendly, they are very popular in both the professional and consumer markets nowadays. Such tests are also widely used in areas where access to trained health care professionals is limited or where access to proper medical facilities is limited (e.g., poor areas, developing countries, war zones, etc.).

Lateral flow chromatographic immunoassay methods and devices have been described extensively. See, e.g., Gordon and Pugh, U.S. Pat. No. 4,956,302; H. Buck, et al., WO 90/06511; T. Wang, U.S. Pat. No. 6,764,825; W. Brown, et al., U.S. Pat. No. 5,008,080; Kuo and Meritt, U.S. Pat. No. 6,183,972, EP 00987551A3. Such assays involve the detection and determination of an analyte substance that is a member of a specific binding pair consisting of a ligand and a receptor. The ligand and the receptor are related in that the receptor specifically binds to the ligand, being capable of distinguishing a specific ligand or ligands from other sample constituents having similar characteristics Immunological assays involving reactions between antibodies and antigens are one such example of a specific binding assay. Other examples include DNA and RNA hybridization reactions and binding reactions involving hormones and other biological receptors. One well-known commercial embodiment of this technique is the Clearblue One-Step Pregnancy Test.

Lateral flow chromatographic immunoassay test cassettes have a number of desirable characteristics including their ease of use and broad applicability to a variety of analytes. Likewise, immunoassay procedures capable of being carried out on a test strip and which can be administered in the field or other locations where medical testing laboratories are not readily available have provided a great benefit to the diagnosis and control of disease. Currently, however, such lateral flow chromatographic immunoassay tests are generally only capable of providing semi-quantitative (i.e., qualitative) results. That is, while currently available lateral flow chromatographic immunoassay test cassettes and cassette reader apparatuses are well-suited for telling a practitioner whether or not one or more test substances are present in a sample above a given detection limit, they are poorly suited for providing a quantitative measurement of analyte(s) above or below that detection limit.

There is an ongoing need in the art for devices and methods that combine the ease of use characteristics of lateral flow chromatographic immunoassay tests with systems that are designed to provide quantitative results. Such devices and methods may, for example, allow medical practitioners to diagnose, monitor, and manage a variety of conditions at the point of care (e.g., chair-side or essentially anywhere in the world) without being tied to a medical facility or a testing laboratory.

BRIEF SUMMARY

Devices and methods for performing a point of care diagnostic test for detecting and quantifying at least one analyte in a sample (e.g., a body fluid) to provide rapid, accurate, affordable laboratory-quality testing at the point of care. Such devices and methods may, for example, use so-called lateral flow assay cassettes to provide rapid, quantitative test results in a point-of-care setting or the like. The devices and the methods of use associated therewith may eliminate or replace expensive, centralized clinical testing equipment and technical personnel. Such testing devices and methods may include automated data reporting and decision support.

In an embodiment, a testing device is disclosed that is adaptable to essentially any handheld digital imaging device such as, but not limited to, a digital camera, a cellular camera phone, a smart phone, a tablet computer, or a similar digital imaging device that includes computing capabilities and/or the ability to communicate with a remote computer. Handheld devices may also include wearable devices such as, but not limited to, Google glasses, the Apple watch, Fitbit, Muse headband, Pavlok wrist band, and the like. Some such devices (e.g., Google glasses and the Apple watch) have their own digital image capture capabilities. Others (e.g., the Fitbit) may be able to send data to and received data from the devices described herein. The testing device includes a sample holder having a sample slot configured to hold an assay device in relation to an image capture means of the handheld digital imaging device, and an expandable/contractible member having the sample holder slidably coupled thereto. In one embodiment, the sample holder can be secured on the expandable/contractible member at the selected position. The expandable/contractible member may be configured for removably attaching the testing device to the digital imaging device and for securely positioning the sample holder and the assay cassette in relation to the image capture means of the handheld digital imaging device. In one embodiment, the expandable/contractible member may be designed to expanded or shortened such that the expandable/contractible member can securely grip essentially any digital imaging device.

In addition to securely gripping a digital imaging device, the sample holder can be moved axially along the expandable/contractible member for positioning the sample holder and the assay cassette in relation to the image capture means (e.g., a lens) of the digital imaging device and, optionally, a light source (e.g., a flash or an autofocus illuminator) associated with the digital imaging device. Alternatively, the sample holder may rely on ambient light to image the assay device or the sample holder may include its own light source. In addition, the sample holder may include a power source, a printed circuit board (removable or integrated), data transmitting means, and the like.

In another embodiment, a testing device includes an expandable/contractible member that includes a first elongate arm slidably coupled to a second elongate arm, gripping members positioned at opposite ends of the expandable/contractible member for removably securing the expandable/contractible member to the digital imaging device, and biasing means for pulling the gripping members toward one another to allow the testing device to grip the digital imaging device. The testing device further includes a sample arm laterally positionable on the expandable/contractible member, means for securing the lateral position of the sample arm on the expandable/contractible member, and a sample housing is positioned at a distal end of the sample arm. In one embodiment, the sample housing may include at least one sample slot configured for insertion of an assay device therein to hold the assay device relation to an image capture means of the handheld digital imaging device.

In yet another embodiment, a testing device includes a body configured to be removably coupled to a handheld digital imaging device. In one embodiment, the body may include a first slot configured to hold an assay device in relation to an image capture means of a handheld digital imaging device, a collimating lens and a light diffuser positioned in the body to allow the digital imaging device to capture an image of the assay cassette inserted in the first slot, and a second slot associated with the body. In one embodiment, the second slot may be a slot like the first slot; i.e., it may be configured to hold an assay device in relation to an image capture means of a handheld digital imaging device. In another embodiment, the second slot may be configured to receive one or more of a second assay cassette, an assay device, assay cassettes of various sizes, a printed circuit board, a microscope slide, a light source, a light diffuser, a light pipe, a movable stage, a power source, a power jack, a data port, a power cord, a data cord, an audio port, a video port, or the like.

In one embodiment, the second slot for the second cassette may be placed in the body in proximity to the first slot (e.g., below the first slot with a divider separating the first slot from the second slot). In another embodiment, the second slot may be placed essentially anywhere in or around the body of the testing device. In such an embodiment, the cassette placed in the second slot may be a printed circuit board device (or the like) that may include means for the second cassette to communicate with the handheld digital imaging device.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof, which are illustrated, in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

Devices and methods for performing a point of care diagnostic test for detecting and quantifying at least one analyte in a sample (e.g., a body fluid) to provide rapid, accurate, affordable laboratory-quality testing at the point of care. Such devices and methods may, for example, use so-called lateral flow assay cassettes to provide rapid, quantitative test results in a point-of-care setting or the like. The devices and the methods of use associated therewith may eliminate or replace expensive, centralized clinical testing equipment and technical personnel. Such testing devices and methods may include automated data reporting and decision support.

Figure 1:
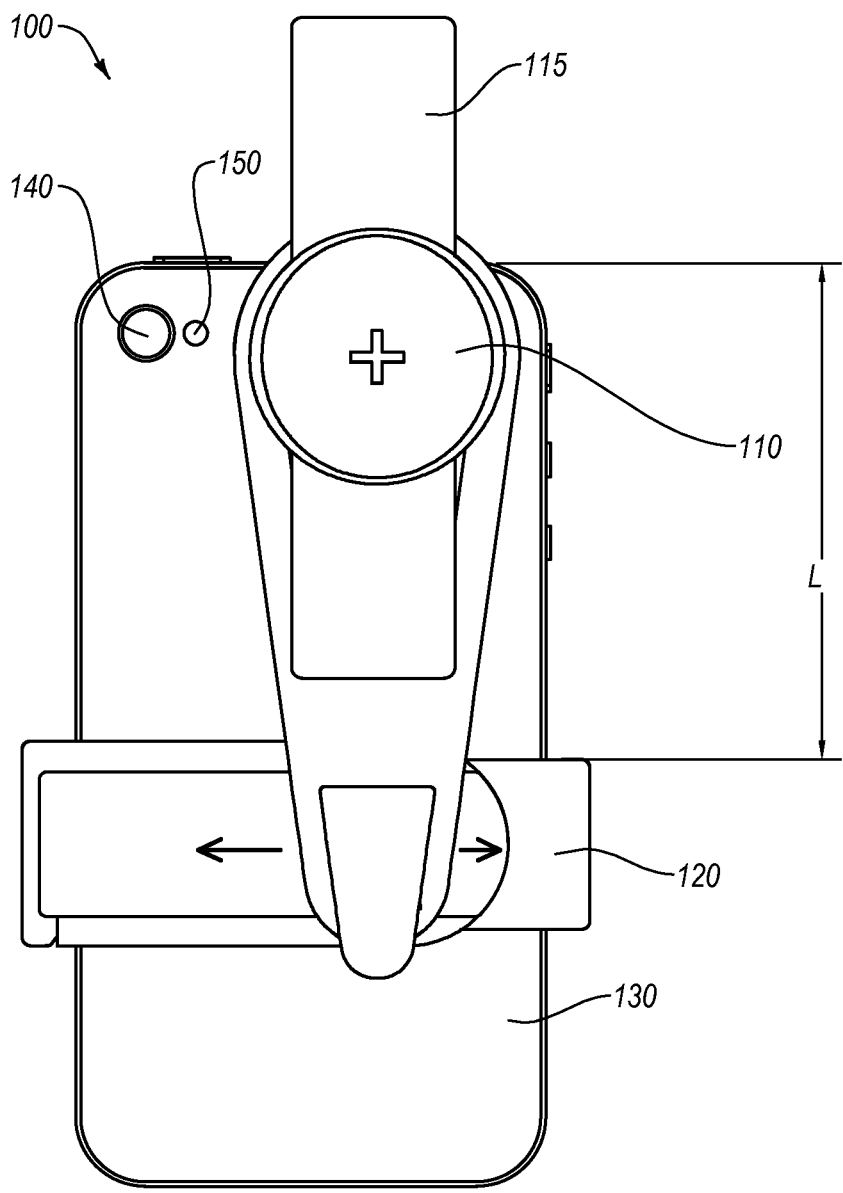
FIG. 1 illustrates a testing device and a digital imaging device, according to one embodiment of the present disclosure.

Referring to FIG. 1, an embodiment of a testing device 100 that includes a digital imaging device 130 is illustrated. The testing device 100 includes a sample holder 110 configured to hold an assay cassette 115 and an expandable/contractible member 120 having the sample holder 110 slidably coupled thereto. In one embodiment, the digital imaging device 130 may be essentially any camera, smart phone, tablet computer, or similar digital imaging device that includes computing capabilities and/or the ability to communicate with a remote computer.

Because various digital imaging devices such as smart-phones (e.g., iPhones, Android phones, etc.), tablet computers (e.g., iPads), and wearable devices (e.g., Google glasses or the Apple Watch) have different sizes and different configurations, it would generally be necessary to configure a different testing device configured for, for example, performing a point of care diagnostic tests to each different type of digital imaging device. The testing devices disclosed herein address this issue by providing a device that can be readily adapted to fit essentially any digital imaging device.

In a first aspect, the expandable/contractible member 120 can be lengthened or shortened so that the device 100 can be fitted to essentially any digital imaging device. Once the device 100 is fitted to a selected digital imaging device, the expandable/contractible member 120 can be secured at the selected length with a securing means (not shown). Suitable examples of securing means include, but are not limited to, screws, bolts, nuts, cam locks, springs, and elastic bands.

In a second aspect, the device 100 can be adapted to essentially any digital imaging device because the sample holder 110 is capable of moving axially along the length of the expandable/contractible member 120. This is important because the placement of the lens on various digital imaging devices is usually quite variable. For example, in the embodiment illustrated in FIG. 1, the lens 140 and the flash 150 of the digital imaging device are located in the upper left corner. Because the sample holder 110 is movable, the sample holder 110 can be moved so that it is positioned over the lens 140 and the flash 150 so that the digital imaging device 130 can capture an image of the assay cassette 115 in the sample holder 110. The position of the gripping arms of the expandable/contractible member 120 can be adjusted to account for different configurations of various digital imaging devices. Likewise, digital imaging devices, like smart phones, have a number of buttons and switches on their exterior surfaces that control various functions (e.g., on/off buttons). Therefore, in one embodiment, sample holder 110 arms of different lengths can be produced to account for the positioning of different features in the exterior of the digital imaging device 130. In another embodiment, the length 'L' of the sample holder 110 arm can be adjusted on the expandable/contractible member 120 to account for the positioning of different features in the exterior of the digital imaging device 130. For instance, the horizontal positioning and vertical positioning of the sample holder arm 110 may be adjustable and fixable with the use of a cam lock, or the like. Likewise, the horizontal positioning and vertical positioning of the sample holder arm 110 may be separately adjustable with separate cam locks (or the like) for adjusting each position.

Once the sample holder 110 is properly positioned relative to the lens and, optionally, the flash of a selected digital imaging device, the sample holder 110 can be secured in position with a securing means (not shown). Suitable examples of securing means include, but are not limited to, screws, bolts, nuts, and cam locks. The securing means for securing the sample holder 110 in place may be the same securing means that is used for securing the length of the expandable/contractible member 120, or it may be a separate securing means.

Figure 2:
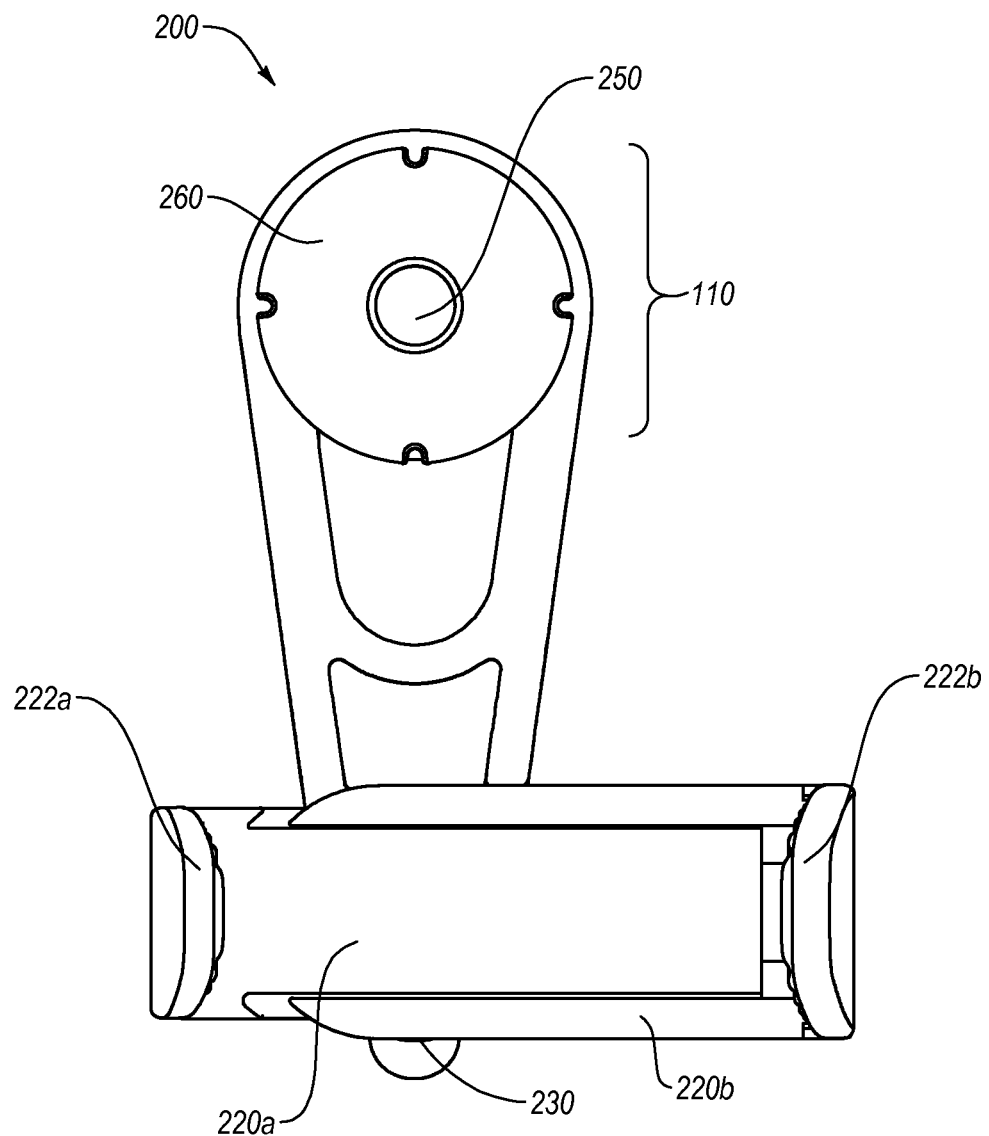
FIG. 2 illustrates a perspective view of an embodiment of a testing device, according to one embodiment of the present invention.

Referring now to FIG. 2, a perspective view of a testing device 200 is illustrated. In the view of FIG. 2, the digital imaging device is removed and the device is rotated 180° relative to the view shown in FIG. 1 so that the interior portion of the device 200 can be seen. The device 200 includes a sample holder 110 and an expandable/contractible member 220. The expandable/contractible member 220 includes a first portion 220a that is slidably coupled to a second portion 220b. The expandable/contractible member 220 can be shortened or lengthened by moving the first and second portions 220a and 220b back and forth. In the illustrated embodiment, the securing means may be a cam lock or the like illustrated at 230. The first and second portions 220a and 220b include a first tab 222a and a second tab 222b that are configured to grip the body of a selected digital imaging device.

Referring now to the sample holder 110, the sample holder 110 includes a lens 250 (e.g., a collimating lens) that may be configured to change the focal length of the lens of the digital imaging device so that the digital imaging device can focus on an assay cassette or the like that is inserted into the sample holder 110. For instance, the focal length of a camera on a typical smart phone is six inches or more. In order to shrink the focal length of the device 200 and in order to have a reasonably compact form factor, the device is equipped with the secondary lens 250 that allows the imaging device to focus on the assay cassette or the like and capture an image of at least the whole analysis portion of the assay cassette in a single image.

Surrounding the lens 250 is a light diffuser 260. Even illumination of the sample is important to allow a digital imaging device to capture an image of the device, generate a calibration curve from standards (if present), and quantify the results of the experiment. Even illumination is also important for providing reliable and consistent assay-to-assay results for multiple assays. To that end, the light diffuser 260 is intended to intended to diffuse and spread light from a light source, such as a flash of the digital imaging device or from ambient lighting, so that an assay cassette or the like that is inserted into the sample holder 110 can be evenly illuminated. In one embodiment, the light diffuser can be made, for example, from frosted glass, plastic, silicone rubber, rubber, plant-based material, or the like. In one embodiment, the light diffuser 260 substantially surrounds the lens 250. Because the position of flashes and the like of digital imaging devices are not consistently located, but a light diffuser 260 surrounding the lens 250 can capture and diffuse light from a flash or autofocus illuminator positioned near the lens of the digital imaging device. Likewise, the light diffuser 260 can capture and diffuse ambient light to provide even illumination to the assay cassette inserted in the sample holder 110. In one embodiment, the sample holder 110 can be fabricated in part or almost entirely from a translucent, light diffusing material such that the sample holder 110 itself may act as a light diffuser. This is particularly preferred in that it provides particularly even illumination and allows for the capture of sufficient light for illumination of the assay and image capture even in low light situations.

In one embodiment, the sample holder 110 is configured to make a light tight connection between the back surface 240 of the sample holder and a body of a digital imaging device. For example, the back surface 240 may be coated with a fabric, such as a black felt or velvet fabric, or provided with a silicone gasket or the like that is capable of preventing light leakage between the back surface 240 of the sample holder and a body of a digital imaging device. Additionally, the region of the sample holder 110 into which the lens 250 is placed can be chamfered or inset or the like so that the diameter of the exterior surface of the sample holder 110 around the lens 250 can accommodate features, such as raised surface features of the digital imaging device or lens curvature, that cause the camera to not be flush with the surface of the digital imaging device.

Figure 3:
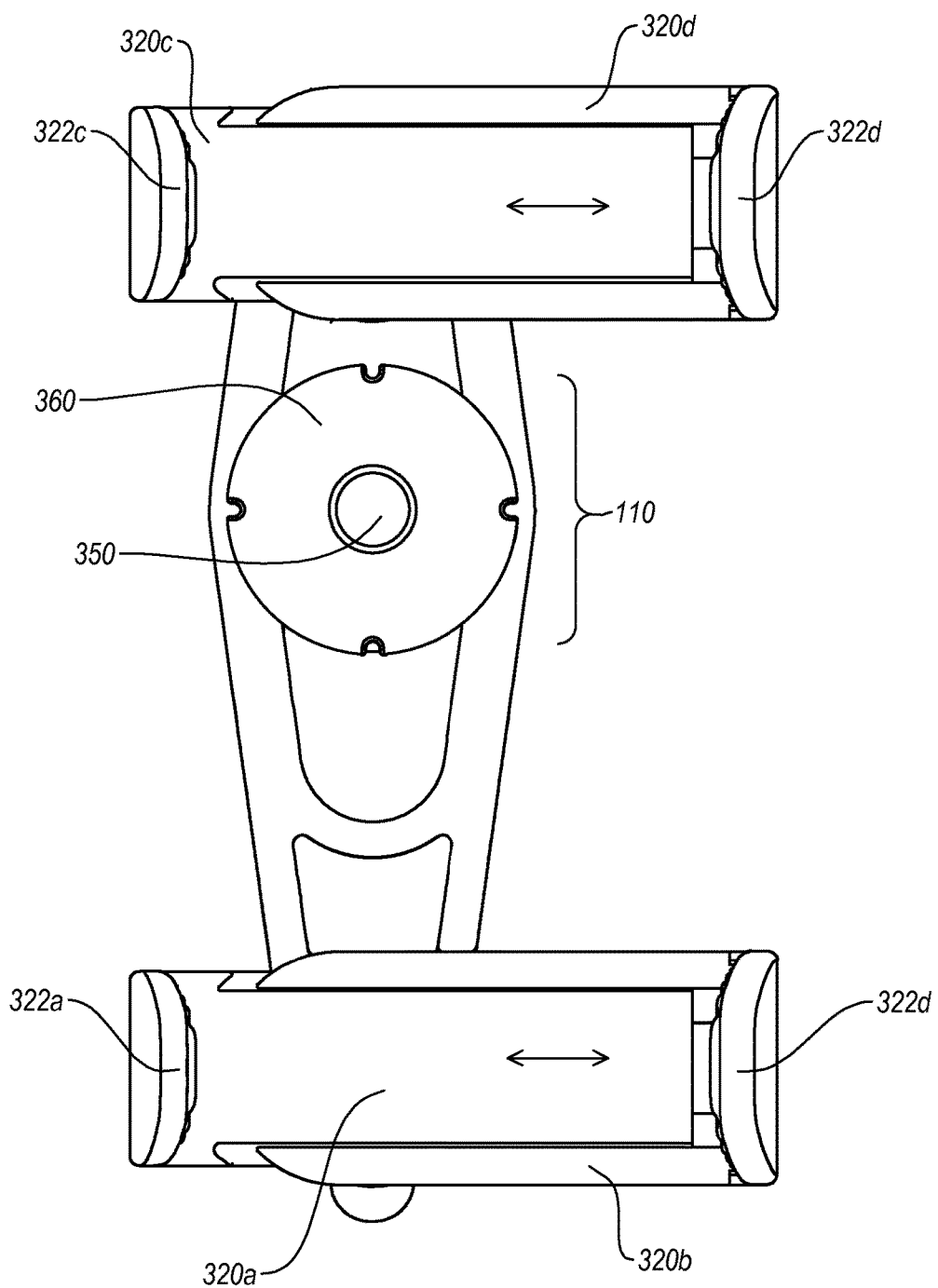
FIG. 3 illustrates a perspective view of another embodiment of a testing device, according to another embodiment of the present invention.

Referring now to FIG. 3, another embodiment of a testing device 300 is illustrated. The testing device 300 includes first and second contractible/expandable members 320 and 321 that have the sample holder 110 slidably coupled thereto such that the sample holder 110 is positioned between the expandable/contractible members 320 and 321. The two expandable/contractible members 320 and 321 may allow the device 300 to better grip a selected digital imaging device and may, for example, facilitate forming a light tight connection between the back surface of the sample holder 110 and a body of a digital imaging device.

The sample holder 110 includes a lens 350 (e.g., a collimating lens) that may be configured to change the focal length of the lens of the digital imaging device so that the digital imaging device can focus on an assay cassette or the like that is inserted into the sample holder 110. Surrounding the lens 350 is a light diffuser 360. In addition to the lens 350 and the light diffuser 360, the sample holder may include one or more optical filters that can transmit one or more selected wavelengths of light. For example, one or more filters maybe inserted in front to the lens 350 so that the digital imaging device can be used for fluorescent imaging, or the like.

The first expandable/contractible member 320 includes a first portion 320a that is slidably coupled to a second portion 320b. Likewise, the second expandable/contractible member 321 includes a first portion 320c that is slidably coupled to a second portion 320d. The first and second portions 320a and 320b of the first member 320 include a first tab 322a and a second tab 322b and the first and second portions 320c and 320d of the second member 321 include a first tab 322c and a second tab 322d that are configured to grip the body of a selected digital imaging device. The first and second expandable/contractible members 320 and 321 can be shortened or lengthened and fixed at a selected length as explained above.

Figure 4:
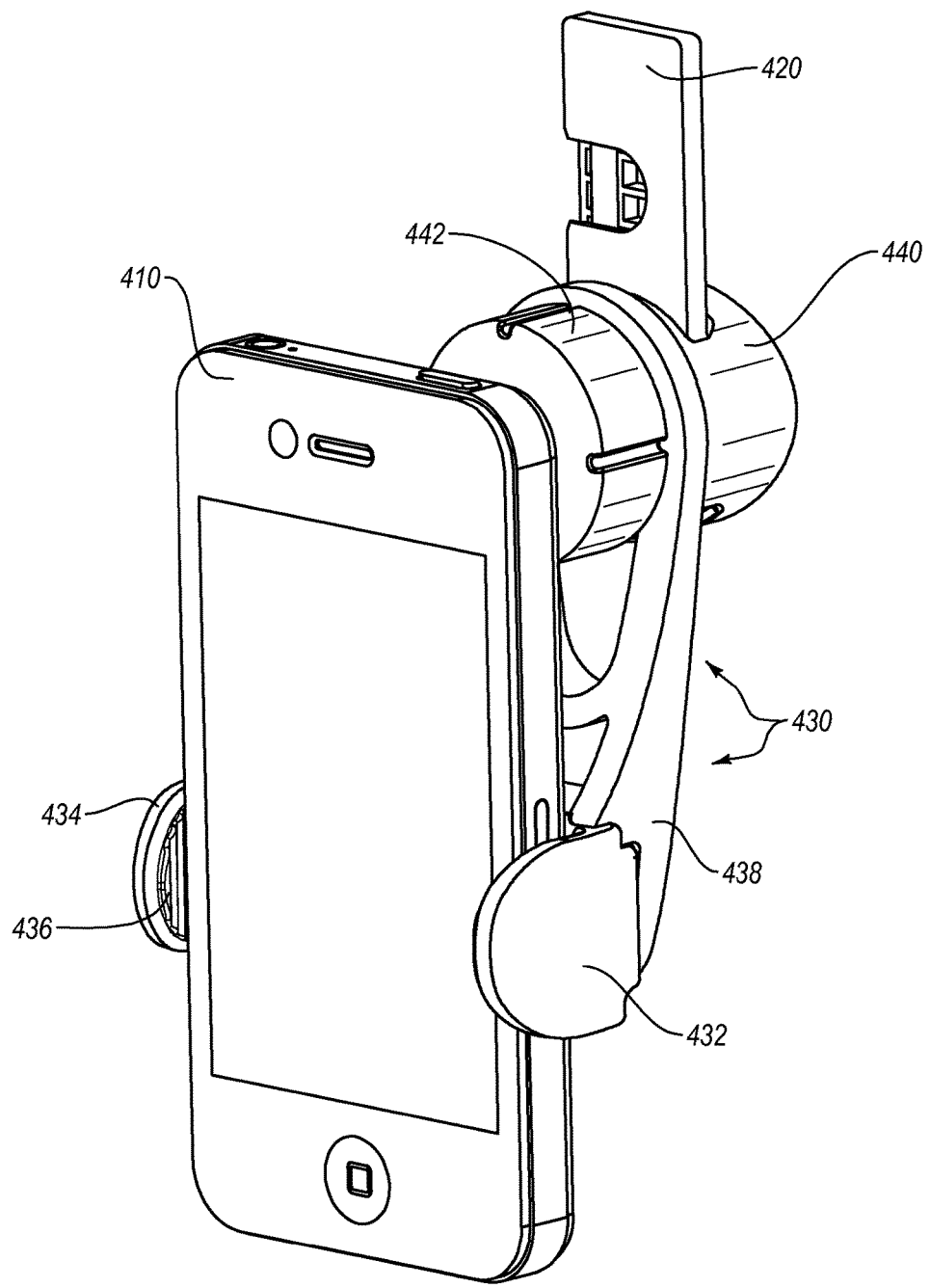
FIG. 4 illustrates a perspective view of a testing device that is adaptable to essentially any handheld digital imaging device coupled to an exemplary digital imaging device, according to one embodiment of the present disclosure.
Figure 5A:
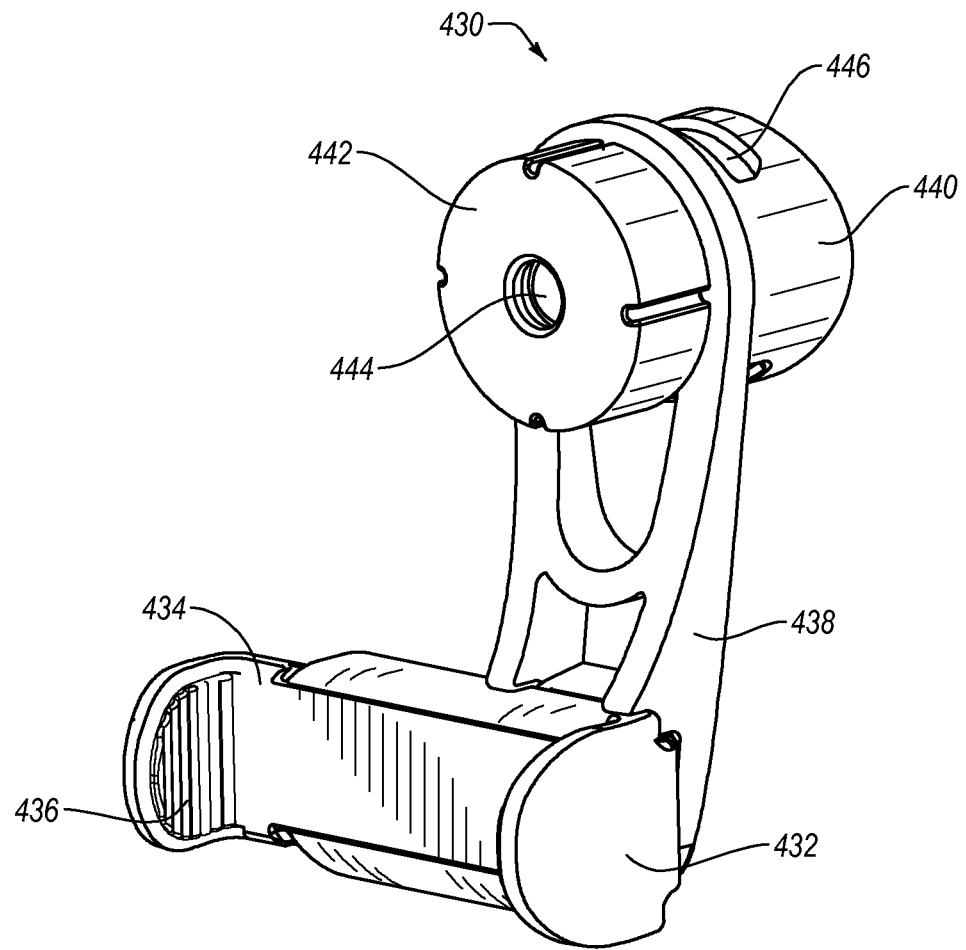
FIGS. 5A-5C illustrate several views the testing device of FIG. 4.
Figure 5B:
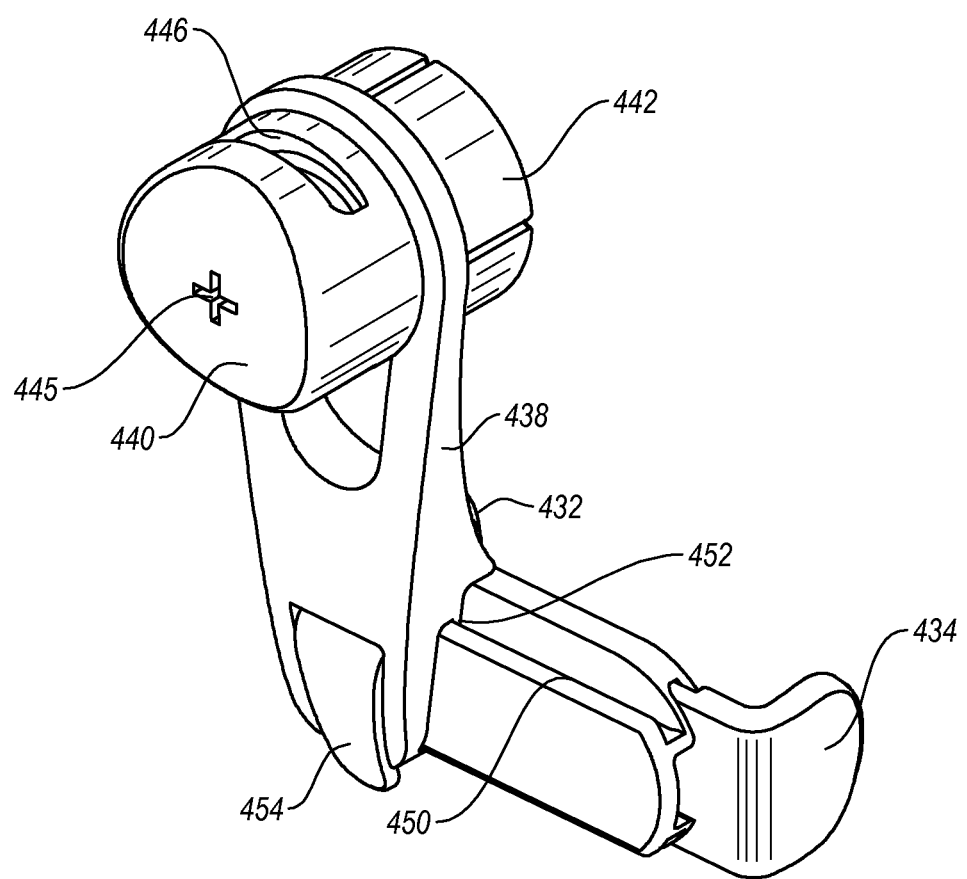
Figure 5C:
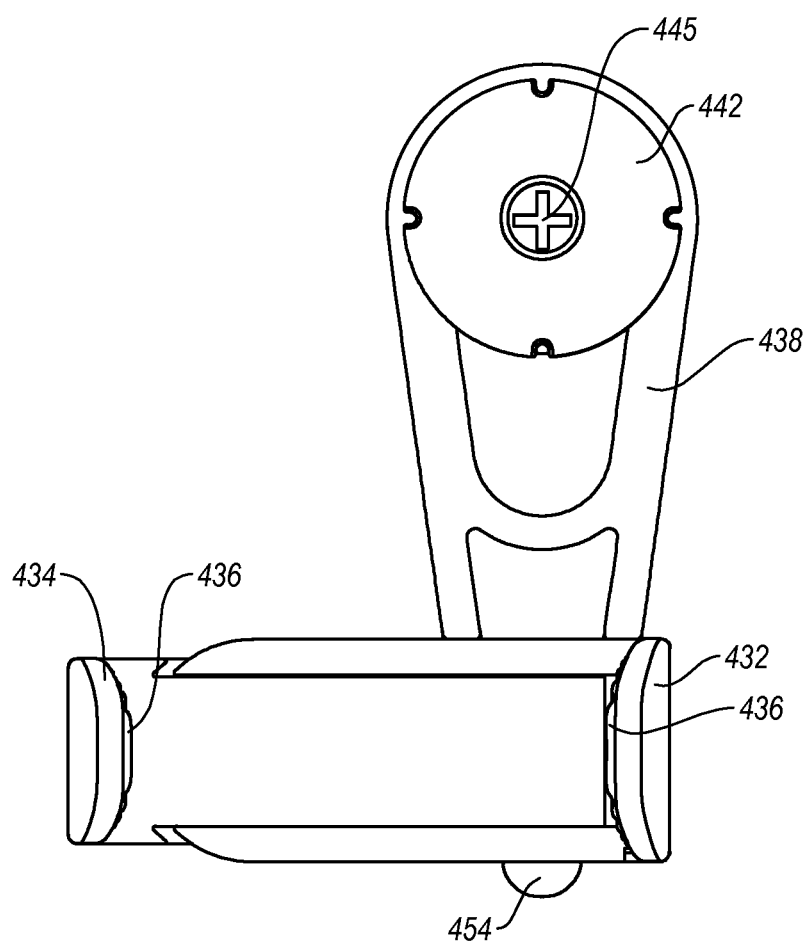

Referring now to FIGS. 4-5C, various views are illustrated of a testing device 430 that is adaptable to essentially any handheld digital imaging device. In FIG. 4, the testing device 430 is coupled to an exemplary digital imaging device 410 and an exemplary assay cassette 420 is inserted in the sample holder 440, according to one embodiment of the present disclosure. The exemplary digital imaging device 410 can be essentially any handheld digital camera, smart phone, cellular telephone, wearable device, or the like. The exemplary assay cassette 420 can be essentially any of a lateral flow assay cassette, a microfluidic device, a microscope slide, a spectrophotometric cell, cuvette holder, a self-contained assay device, or the like. FIGS. 5A-5C illustrate several views the testing device of FIG. 4 with the exemplary digital imaging device 410 and the exemplary assay cassette 420 removed for clarity.

In one embodiment, the digital imaging device 410 may include communications capabilities such as, but not limited to, cellular telephonic communications, WiFi, Bluetooth, and near field communications. In one embodiment, the digital imaging device 410 may include or be communicatively coupled to a computing device and an interpretive algorithm stored in a computer readable format and electronically coupled to the device 410, wherein the interpretive algorithm is configured to (i) calculate a calibration curve and (ii) calculate an amount of an analyte present in a sample based on a detectable signal from the assay cassette.

The testing device 430 includes an expandable/contractible member that is comprised of a first arm 432, a second arm 434, and grippers 436. In one embodiment, the first and second arms 432 and 434 are slidably coupled relative to one another and biased towards one another so that the grippers 436 of the arms 432 and 434 can grip the digital imaging device 410.

In the illustrated embodiment, a sample arm 438 is slidably coupled to the arms 432 and 434. A sample housing, which includes a first part 440 and a second part 442, is disposed at the distal end of the sample arm 438. As explained in greater detail above, the sample arm is slidably coupled to the arms 432 and 434 so that the sample housing can be positioned in relation to an image capture means (e.g., a lens) of the digital imaging device. In the illustrated embodiment, the second part of the sample housing includes a lens 444 (e.g., a collimating lens) that is selected and configured to allow the digital imaging device 410 to focus on at least the analysis portion of the assay cassette 420 inserted into the sample housing.

In the illustrated embodiment, the sample housing 440/442 is fabricated from a first part 440 and a second part 442. This may, for example, facilitate manufacture and material selection. For instance, the sample arm 438, the first part 440 of the sample housing, and the second part 442 of the sample housing may be fabricated as separate pieces. The sample arm and sample housing may be assembled by fitting the first part 440 of the sample housing and the second part 442 together into a distal portion of the sample arm that is configured to receive the sample housing. Likewise, as explained above, all or one or more selected portions of the sample housing may be fabricated from a translucent material so that the sample housing may act as a light diffuser. In one embodiment, either the first half 440, the second half 442, or both halves 440 and 442 of the sample housing may be fabricated from a translucent material (e.g., a silicone rubber). In one embodiment, the region of the second half of the sample holder 442 into which the lens 444 is placed can be chamfered or inset or the like. This can, for example, allow the sample holder accommodate raised surface features on the digital imaging device so that the second half of the sample holder 442 can sit flush with the surface of the digital imaging device 410. Likewise, this can allow the sample holder to achieve a light-tight connection with the camera when the camera or related elements are not flush with the surface of the digital imaging device 410.

Referring to FIGS. 5A and 5B, it can be seen that the first half of the sample housing 440 includes a sample slot 446. The sample slot 446 may be configured to receive an assay cassette, assay cassettes of various sizes, a printed circuit board, a self-contained assay device, a microscope slide, a light source, a light diffuser, a light pipe, a movable stage, a power source, a power jack, a data port, a power cord, a data cord, reagents, an audio port, a video port, or the like, and combinations thereof. While the assay device 430 is illustrated with one sample slot 446, it will be understood that the sample housing 440/442 may be configured to hold more than one cassette. In one embodiment, a first slot may be configured to hold a first cassette and the second slot may be configured to receive one or more of an assay cassette, assay cassettes of various sizes, a printed circuit board, a self-contained assay device, a microscope slide, a light source, light diffuser, a light pipe, a movable stage, a power source, a power jack, a data port, a power cord, a data cord, reagents, an audio port, a video port, or the like, and combinations thereof.

Similarly, one or more sample housings like that shown at 440/442 in FIGS. 4-5C may be placed in parallel to one another to make a device with multiple sample slots. Such a device with multiple sample holders and slots can be used for performing different kinds of experiments in one device or the extra slots can configured to receive one or more of an assay cassette, assay cassettes of various sizes, a printed circuit board, a self-contained assay device, a microscope slide, a light source, a light diffuser, a light pipe, a movable stage, a power source, a power jack, a data port, a power cord, a data cord, reagents, an audio port, a video port, or the like, and combinations thereof. In one embodiment of such a configuration, a sample cassette may be placed in a first slot of a first sample housing for a first experiment. Then the cassette may be moved to a second sample slot of a second sample housing for a second experiment. For example, first sample slot may be configured for visible light experiments and the one or more additional sample slots may be configured for fluorescent or electrochemical experiments or the like. The first sample slot and the one or more additional sample slots may be in-line with one another so that a sample cassette may be slide from one sample slot to another, or the sample slots may be arranged such that a sample cassette can be moved from one slot to another by removing the cassette from one slot and placing it into another.

There are a number of ways to accommodate cassettes of various sizes. These include a cassette holder that is configured to hold cassettes of any size in such a way that the lateral flow strip is correctly positioned for imagining in the device. The cassette holder could include an indexing feature to insure that the cassette is correctly positioned. Such a cassette holder could use adjustable sliders (e.g., similar to those on a printer to accommodate variously sized paper). Alternatively, the reader could include an adjustable arm that extends in a plane parallel to that of the slot into which a cassette is inserted. This arm would be adjustable in length and serve to index the strip in the correct position.

The printed circuit board in the examples above may be used for performing an electrochemical assay (e.g., a blood sugar test) or a printed circuit board may be used to introduce new programming into the digital imaging device 410 in order to run/read an assay. Likewise, a printed circuit board may be included in a self-contained assay device that may include its own hardware, illumination, image capture, interpretive software, communications capabilities (e.g., wireless, Bluetooth, or wired communication) for communication with the digital imaging device, and the like for performing an assay. Examples of printed circuit boards include those used to read Nova Biomedical electrochemical tests and printed circuit boards manufactured by ZDT Technology. (ZDT printed circuit boards can include a light source and color detector and are programmable.)

Referring now to FIGS. 5B and 5C, means for positioning the sample arm 438 and the sample housing 440/442 relative to the digital imaging device 410 is illustrated. In the illustrated embodiment, the means for positioning the sample arm 438 and the sample housing 440/442 include a slot 450 that tabs 452 of the sample arm 438 fit into to secure the sample arm 438 to the outer half expandable/contractible member 432. The sample arm 438 can slide back and forth in the track 450 to position the sample arm 438 and the sample housing 440/442 relative to the image capture means of the digital imaging device 410. In the illustrated embodiment, the selected position of the sample arm 438 and the sample housing 440/442 may be secured with the cam lock illustrated at 454. The views shown in FIGS. 5B and 5C also illustrate an optional sighting device 445 that can be used to help position the sample arm 438 and the sample housing 440/442 over the image capture means (e.g., the lens) of the digital imaging device. Looking from the back, the lens of the digital imaging device can be seen through the sighting device. In FIG. 5C, the lens of the sample housing is removed so that the optional sighting device 445 can be seen. Viewing through a preview function of a digital imaging device, the position of the sample arm 438 and the sample housing 440/442 can be fine tuned so that the optional sighting device 445 is in the center of the image.

Figure 6A:
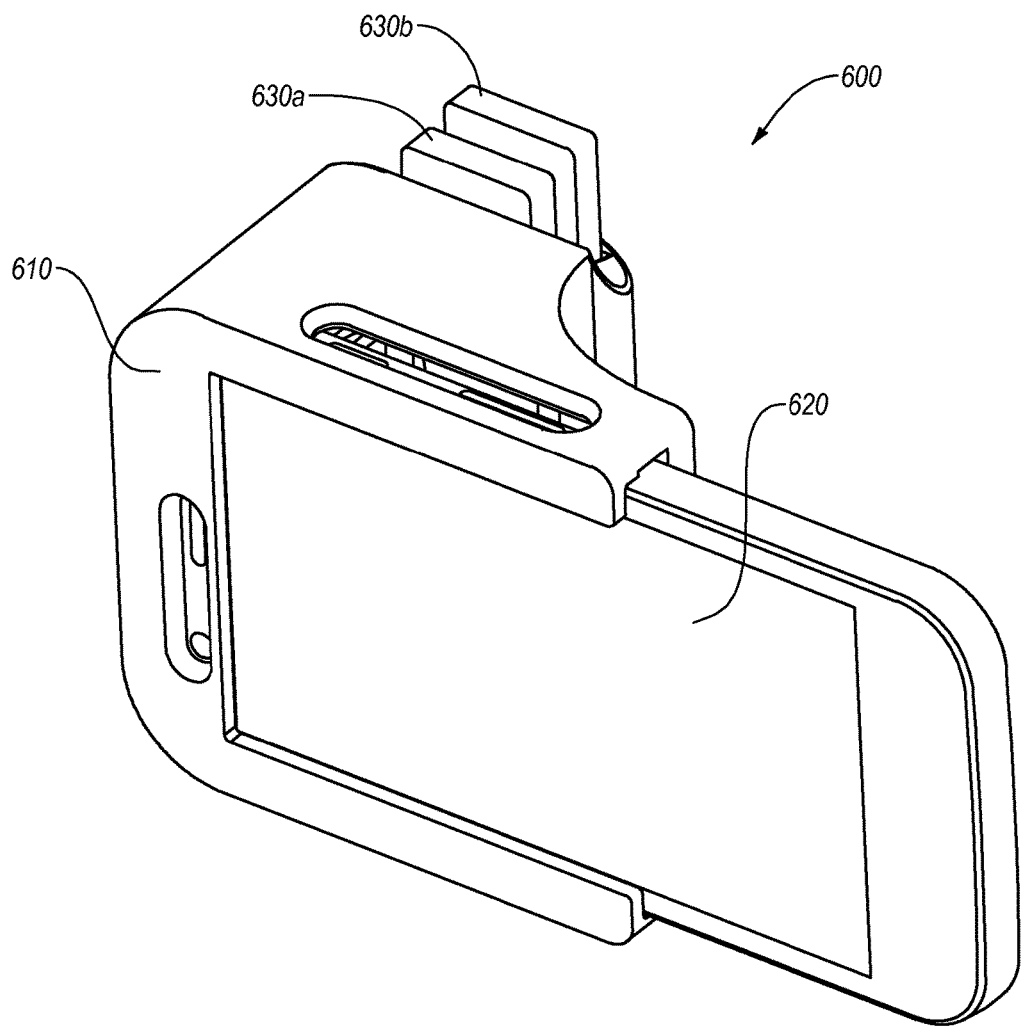
FIGS. 6A and 6B illustrate a testing device and a digital camera device, according to another embodiment of the present invention.
Figure 6B:
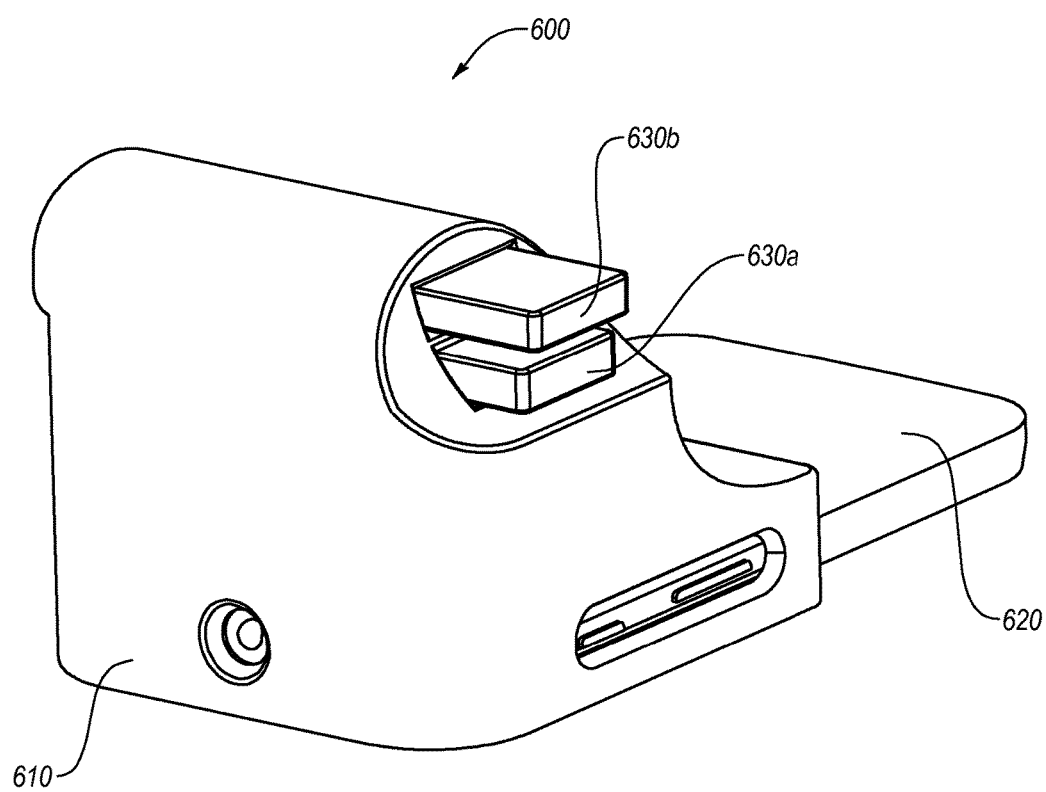

Referring now to FIGS. 6A and 6B, views of a sample holder device 600 are illustrated. The sample holder device 600 includes a body 610 configured to be removably coupled to a digital imaging device 620. In the illustrated embodiment, the body 610 is configured to receive a first assay cassette 630a and a second assay cassette 630b.

In one embodiment, the digital imaging device 620 may be one of a digital camera, a smart phone, or a tablet computer. In one embodiment, the digital imaging device 620 may include or may be connected to a digital computing device. In one embodiment, the digital imaging device 620 may include wireless communications capabilities such as, but not limited to, WiFi, Bluetooth, and near field communications.

In one embodiment, the digital imaging device 620 may include an onboard computing device or be connected or connectable to an offboard computing device. In either case, the computing device may include an interpretive algorithm stored in a computer readable format and electronically coupled to the device, wherein the interpretive algorithm is configured to (i) calculate a calibration curve and (ii) calculate an amount of an analyte present in a sample based on a detectable signal from the assay cassette.

In the illustrated embodiment, the assay cassettes 630a and 630b are positioned in the body such that a camera of the digital imaging device can capture an image of the first and second assay cassettes 630a and 630b. In one example, the assay cassettes 630a and 630b could be used to run separate assays simultaneously on separate assay cassettes. A method of reading both cassettes may include capturing an image of the first cassette 630, removing the first cassette 630a, and subsequently capturing an image of the second cassette 630b.

In the illustrated embodiment, the body 610 includes a slot for a second cassette 630b. In another embodiment, the body 610 may be configured to receive the first cassette 630a and the second slot of the sample holder device 600 may be configured to receive one or more of an assay cassette, assay cassettes of various sizes, a printed circuit board, a self-contained assay device, a microscope slide, a light source, a light diffuser, a light pipe, a movable stage, a power source, a power jack, a data port, a power cord, a data cord, reagents, an audio port, or a video port. In such an embodiment, the first assay cassette 630a may be positioned in the body such that a camera of the digital imaging device can capture an image of the first assay cassette 630a and the second assay cassette may be positioned elsewhere in the body 610 or even outside the body 610 in, for example, a wearable device (e.g., Google glasses, Apple watch, Fitbit, Muse headband, Pavlok wrist band, etc.) or an implantable device.

There are a number of ways to accommodate cassettes of various sizes. These include a cassette holder that is configured to hold cassettes of any size in such a way that the lateral flow strip is correctly positioned for imagining in the device. The cassette holder could include an indexing feature to insure that the cassette is correctly positioned. Such a cassette holder could use adjustable sliders (e.g., similar to those on a printer to accommodate variously sized paper). Alternatively, the reader could include an adjustable arm that extends in a plane parallel to that of the slot into which a cassette is inserted. This arm would be adjustable in length and serve to index the strip in the correct position.

The printed circuit board in the examples above may be used for performing an electrochemical assay (e.g., a blood sugar test) or a printed circuit board may be used to introduce new programming into the digital imaging device 410 in order to run/read an assay. Likewise, a printed circuit board may be included in a self-contained assay device that may include its own hardware, illumination, image capture, interpretive software, communications capabilities (e.g., wireless, Bluetooth, or wired communication) for communication with the digital imaging device, and the like for performing an assay. Examples of printed circuit boards include those used to read Nova Biomedical electrochemical tests and printed circuit boards manufactured by ZDT Technology. (ZDT printed circuit boards can include a light source and color detector and are programmable.)

Figure 7A:
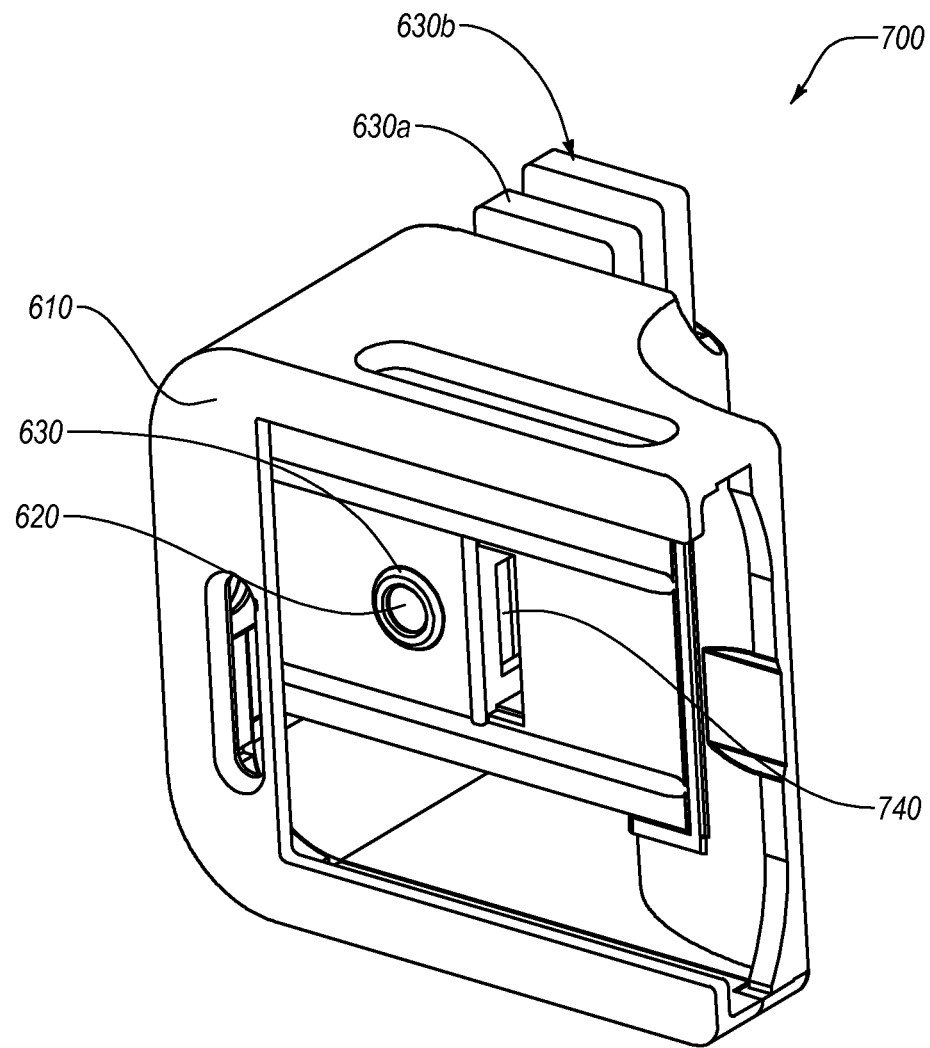
FIGS. 7A-7D illustrate various views of the testing device of FIGS. 6A and 6B.

Referring now to FIGS. 7A-7D, various views of the body 610 of the sample holder device are illustrated. In FIG. 7A, the digital imaging device is removed permitting a view of the interior of the body 610. The interior of the body 610 includes a lens wall 710 that includes a lens 720 (e.g., a collimating lens), a lens bezel 730, and a light diffuser 740. In the illustrated embodiment, the light diffuser 740 is a light pipe or a similar device. Nevertheless, the lens wall 710 could be modified as discussed above such that the lens 720 is substantially surrounded by a light diffuser. For example, the lens bezel 730 could be modified so that it is a frosted glass or plastic ring that is capable of diffusing and spreading light from a light source such that the first and second cassettes 630a and 630b can be evenly illuminated. While the foregoing assumes that the sample holder device 600 uses a light source from the digital image capture device, some embodiments of a body 610 may include a light source capable of transmitting at least one wavelength of light configured to yield a detectable signal from an assay performed on an assay cassette.

Figure 7B:
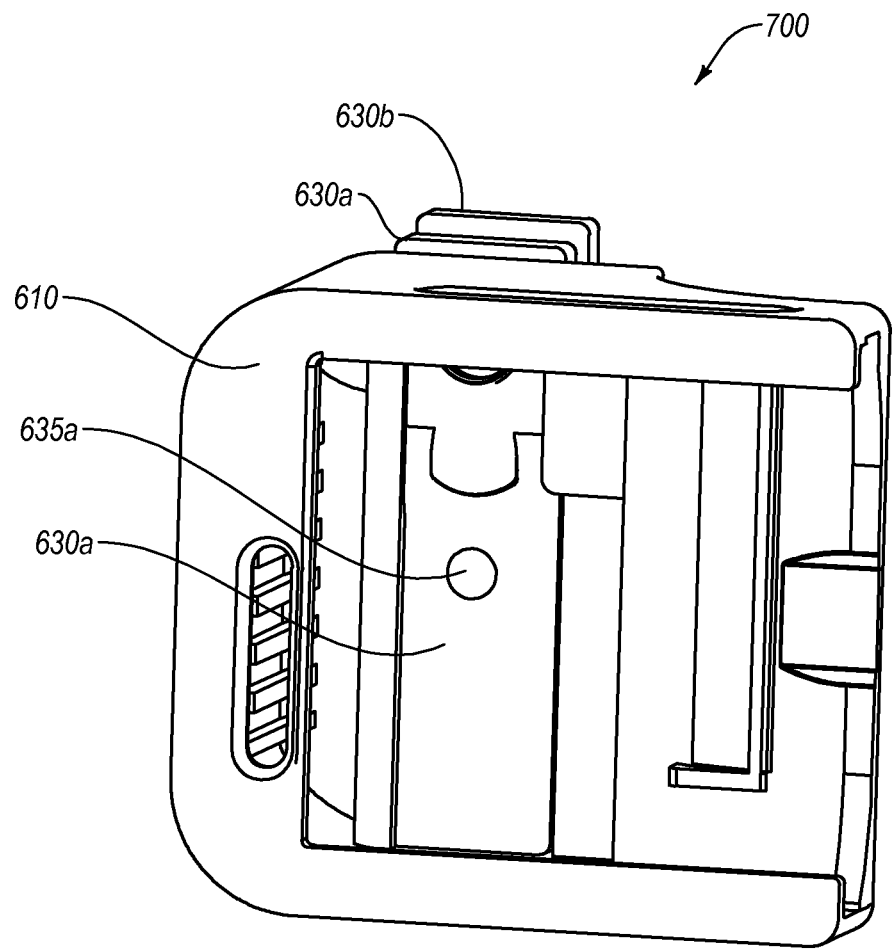

Referring now to FIG. 7B, a view of the body 610 with the lens wall removed is shown. In FIG. 7B, the lens wall 710 discussed above is removed, which allows a view of the first assay cassette 630a from the inside of the body 610. The first assay cassette 630a includes an analysis zone 635a that is viewable and imagable by a digital image capture device.

Figure 7C:
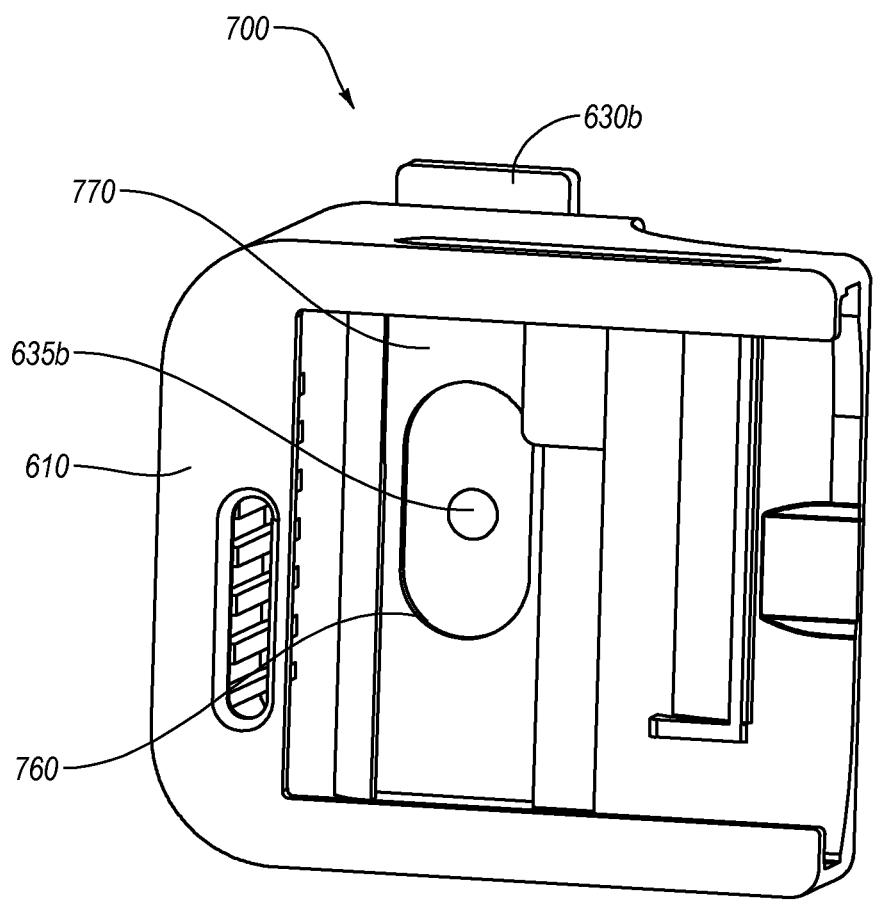
Figure 7D:
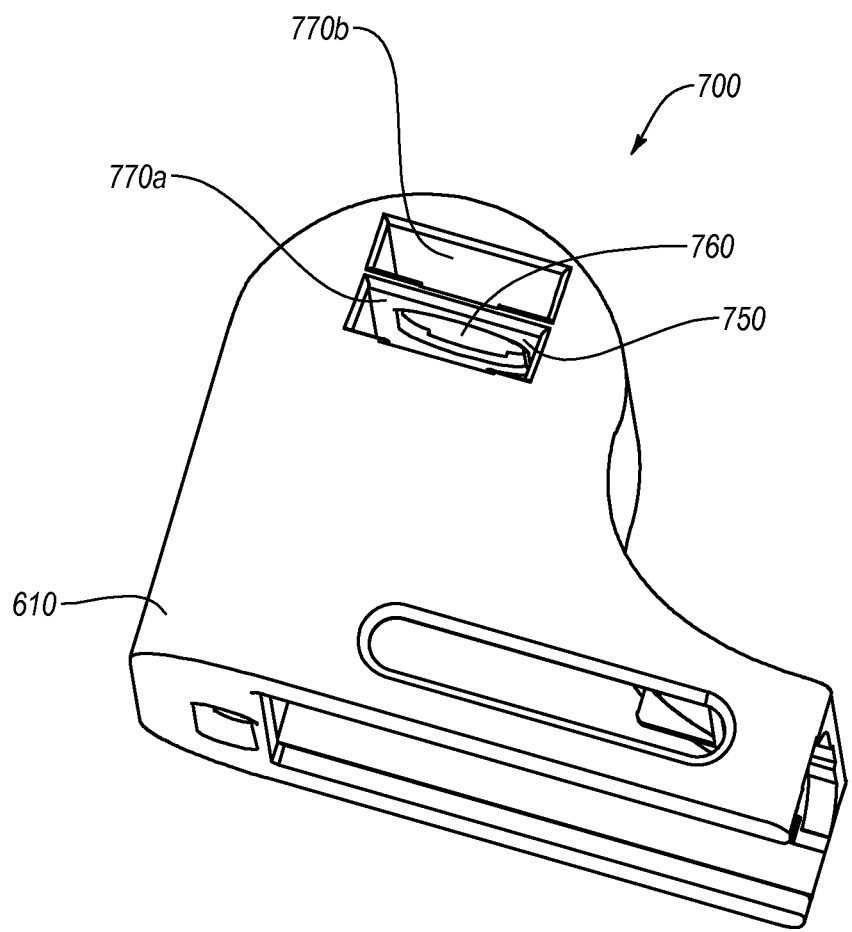

Referring now to FIG. 7C, a view of the body 610 with the first cassette removed is shown. As can be seen when the first cassette is removed, the body 610 includes a divider 750 that divides the slot for the first cassette and the second cassette 630b. The divider includes a window 760 that allows the digital image capture device to see the second cassette 630b when the first cassette is removed. FIG. 7D illustrates a side view of the body 610 with both cassettes removed to show the first cassette slot 770a and the second cassette slot 770b. The divider 750 and the window 760 can also be seen.

In addition to just being a window, the window 760 may include one or more of a lens, a digital camera, a digital microscope, or a fluorescent, visible, infrared light source, or the like.

Embodiments of the present disclosure may comprise or utilize special purpose or general-purpose computing devices that include computer hardware, such as, for example, one or more processors and system memory, as discussed in greater detail below. Embodiments within the scope of the present invention also include physical and other computer-readable and recordable type media for carrying or storing computer-executable instructions and/or data structures. Such computer-readable recordable media can be any available media that can be accessed by a general purpose or special purpose computer system. Computer-readable media that store computer-executable instructions according to the invention are recordable-type storage media or other physical computer storage media (devices) that are distinguished from mere transitory carrier waves.

Computer-readable media that carry computer-executable instructions are transmission media. Thus, by way of example, and not limitation, embodiments of the invention can comprise at least two distinctly different kinds of computer-readable recordable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer and which are recorded on one or more recordable type medium (device).

A "network" is defined as one or more data links or communication channels that enable the transport of electronic data between computer systems and/or modules and/or other electronic devices. When information is transferred or provided over a network or another communications connection or channel (either hardwired, wireless, or a combination of hardwired or wireless) to a computer, the computer properly views the connection as a transmission medium. Transmissions media can include a network and/or data links that can be used to carry or desired program code means in the form of computer-executable instructions or data structures that can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the invention may be practiced in network computing environments with many types of computer system configurations, including, personal computers, desktop computers, laptop/notebook computers, message processors, hand-held devices, multiprocessor systems, microprocessor-based or programmable consumer electronics, network PCs, minicomputers, mainframe computers, tablets, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In particular, one or more embodiments of the invention may be practiced with mobile consumer computing devices. Mobile consumer computing devices or more simply, mobile consumer devices, can be any of a broad range of computing devices designed or optimized for portability and for personal use. Mobile consumer devices can take a variety of forms, ranging from more traditional notebook and netbook computers to an emerging and rapidly growing market of handheld devices, including smart phones (e.g., the APPLE IPHONE, ANDROID phones, WINDOWS phones, SYMBIAN phones), tablet computers (e.g., the APPLE IPAD, ANDROID tablets), gaming devices (e.g., NINTENDO or PLAYSTATION portable gaming devices, the APPLE IPOD), multimedia devices (e.g., the APPLE IPOD, and/or wearables such as, but not limited to, GOOGLE GLASSES, APPLE WATCH, FITBIT, MUSE HEADBAND, and the PAVLOK WRIST BAND), and combinations thereof. Many of these devices can enable rich user-interactivity by including combinations of output, input, and other sensory devices, such as touch- or pressure-sensitive displays (using capacitive or resistive technologies, for example), still and video cameras, Global Positioning System (GPS) receivers, magnetic compasses, gyroscopes, accelerometers, light sensors, proximity sensors, microphones, speakers, etc. These devices can also comprise a variety of communications devices, such as combinations of cellular modems (e.g., Global System for Mobile Communications (GSM), Code division multiple access (CDMA)), Wireless Fidelity (Wi-Fi) radios, Bluetooth radios, Near Field Communication (NFC) devices, etc. Many mobile consumer devices are expandable, such that a user can add new hardware and functionality not present during manufacture of the device. It will be appreciated that as the market for mobile consumer devices expands and develops, the functionality of these devices will also expand to utilize new and improved user-interaction devices and communications devices. The embodiments described herein are expansive and can also utilize any future developments in the field of mobile consumer devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A testing device, comprising:
    a sample holder comprising a sample housing having a sample slot configured to hold an assay device in relation to an image capture means of a handheld digital imaging device, wherein the sample housing is at least partially fabricated from a translucent, light-diffusing material to provide substantially even illumination to the assay device; and
    an expandable/contractible member having the sample holder slidably coupled thereto, the expandable/contractible member being configured for being removably attached to the handheld digital imaging device and for securely positioning the sample holder and the assay device in relation to the image capture means of the handheld digital imaging device.

2. The testing device of claim 1, wherein the sample holder comprises:
    a sample arm slidably coupled to the expandable/contractible member, wherein the sample housing is positioned at a distal end of the sample arm,
    wherein the sample arm is dimensioned to position the sample housing and the assay device in relation to the image capture means of the handheld digital imaging device while allowing positioning of the expandable/contractible member so as to not interfere with function of the handheld digital imaging device.

3. The testing device of claim 1, wherein the expandable/contractible member comprises a first elongate arm slidably coupled to a second elongate arm, means for securing a selected width of the expandable/contractible member, and gripping members positioned at opposite ends of the expandable/contractible member for securing the expandable/contractible member to the handheld digital imaging device.

4. The testing device of claim 3, wherein the expandable/contractible member further comprises means for securing a selected position of the sample holder along the expandable/contractible member and in relation to at least the image capture means of the handheld digital imaging device.

5. The testing device of claim 4, wherein the means for securing a selected position of the sample holder include one or more of elastic bands, spring members, screws, bolts, nuts, or cam locks.

6. The testing device of claim 1, wherein the handheld digital imaging device is one of a handheld digital camera, a cellular telephone, a smart phone, a tablet computer, or a wearable device.

7. The testing device of claim 1, wherein the handheld digital imaging device includes or is connected to a digital computing device.

8. The testing device of claim 7, wherein the handheld digital imaging device includes an onboard computing device and an interpretive algorithm stored in a computer readable format and electronically coupled to the device, wherein the interpretive algorithm is configured to (i) calculate a calibration curve and (ii) calculate an amount of an analyte present in a sample based on a detectable signal from the assay device.

9. The testing device of claim 7, wherein the handheld digital imaging device includes wireless communications capabilities.

10. The testing device of claim 1, wherein the sample holder includes a lens selected to allow the handheld digital imaging device to capture an image of the assay device.

11. The testing device of claim 1, further comprising at least a second sample slot.

12. A testing device, comprising:
    an expandable/contractible member comprising a first elongate arm slidably coupled to a second elongate arm, and gripping members positioned at opposite ends of the expandable/contractible member for removably securing the expandable/contractible member to a handheld digital imaging device;
    a sample arm laterally positionable on the expandable/contractible member;

means for securing the lateral position of the sample arm on the expandable/contractible member; and a sample housing at least partially fabricated from a translucent, light-diffusing material to provide substantially even illumination to an assay device and positioned at a distal end of the sample arm, the sample housing including at least one sample slot configured for insertion of the assay device therein and to hold the assay device in relation to an image capture means of the handheld digital imaging device.

13. The testing device of claim 12, wherein the sample housing further comprises a lens positioned and selected to allow the handheld digital imaging device to capture an image of the assay device inserted in the sample housing.

14. The testing device of claim 12, wherein the sample arm is vertically positionable on the expandable/contractible member to allow positioning of the sample housing and the assay device in relation to the image capture means of the handheld digital imaging device while allowing positioning of the expandable/contractible member so as to not interfere with function of the handheld digital imaging device.

15. The testing device of claim 12, further comprising at least a second sample slot.

16. The testing device of claim 15, wherein the second slot is configured to receive one or more of an assay device, assay cassettes of various sizes, a printed circuit board, a microscope slide, a light source, a light diffuser, a light pipe, a movable stage, a power source, a power jack, a data port, a power cord, a data cord, an audio port, or a video port.

* * * * *